(12) United States Patent
Sugino et al.

(10) Patent No.: US 8,398,737 B2
(45) Date of Patent: Mar. 19, 2013

(54) MAT MEMBER AND EXHAUST GAS PROCESSING APPARATUS

(75) Inventors: Junichi Sugino, Takahama (JP); Hideki Furusawa, Ogaki (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 12/572,478

(22) Filed: Oct. 2, 2009

(65) Prior Publication Data

US 2010/0107582 A1    May 6, 2010

(30) Foreign Application Priority Data

Nov. 6, 2008 (JP) ................................. 2008-285840

(51) Int. Cl.
*B01D 39/20* (2006.01)

(52) U.S. Cl. ......... 55/523; 55/502; 55/DIG. 30; 60/311; 422/177

(58) Field of Classification Search ............. 55/490, 55/491.492, 502, 522, 523, 524, 527; 428/3, 428/292.1, 293.4, 116–118; 156/60, 306.3; 422/177; 60/311; 442/334, 414, 177; 502/527.19–527.22

See application file for complete search history.

(56) References Cited

U.S. PATENT DOCUMENTS

| | | | | |
|---|---|---|---|---|
| 4,305,992 A * | 12/1981 | Langer et al. | ............ | 428/324 |
| 4,828,913 A | 5/1989 | Kiss | | |
| 4,929,429 A * | 5/1990 | Merry | ............ | 422/179 |
| 5,254,410 A * | 10/1993 | Langer et al. | ............ | 428/402 |
| 5,393,603 A * | 2/1995 | Toyoda et al. | ............ | 428/316.6 |
| 5,853,675 A * | 12/1998 | Howorth | ............ | 422/179 |
| 2002/0025904 A1* | 2/2002 | Goto et al. | ............ | 502/150 |
| 2003/0157295 A1 | 8/2003 | Burns, Jr. et al. | | |

(Continued)

FOREIGN PATENT DOCUMENTS

| | | |
|---|---|---|
| DE | 3127846 A1 | 2/1983 |
| EP | 1 314 866 A2 | 5/2003 |

(Continued)

OTHER PUBLICATIONS

Anonymous:"Thermoplastic expandable microspheres used with resins to form lightweight core material-used in sandwich constructions, comprises thermoplastic polymer shell and fluid core which expands on heating",XP002556372, Database WPI Week, 19932 Thomson Scientific, London , GB; May 10, 1993.

(Continued)

*Primary Examiner* — Duane Smith
*Assistant Examiner* — Thomas McKenzie
(74) *Attorney, Agent, or Firm* — IPUSA, PLLC

(57) ABSTRACT

A mat member includes an inorganic fiber, an organic binder, and a material which expands at a temperature of approximately 130° C. to approximately 200° C.

4 Claims, 7 Drawing Sheets

U.S. PATENT DOCUMENTS

| | | | |
|---|---|---|---|
| 2004/0052698 A1* | 3/2004 | Sanocki et al. | 422/179 |
| 2004/0134172 A1* | 7/2004 | Kumar et al. | 55/523 |
| 2004/0231307 A1* | 11/2004 | Wood et al. | 55/523 |
| 2005/0232827 A1* | 10/2005 | Merry | 422/179 |
| 2005/0232828 A1* | 10/2005 | Merry | 422/179 |
| 2006/0075731 A1* | 4/2006 | Ohno et al. | 55/523 |
| 2006/0154040 A1* | 7/2006 | Merry | 428/292.1 |
| 2006/0154998 A1* | 7/2006 | Shiba et al. | 521/142 |
| 2007/0098973 A1* | 5/2007 | Wagner et al. | 428/292.1 |
| 2007/0110978 A1* | 5/2007 | Kawaguchi et al. | 428/292.1 |
| 2007/0148455 A1* | 6/2007 | Ke | 428/375 |
| 2008/0075864 A1 | 3/2008 | Billotto et al. | |
| 2008/0241466 A1* | 10/2008 | Saito et al. | 428/116 |
| 2009/0223644 A1 | 9/2009 | Araki et al. | |

FOREIGN PATENT DOCUMENTS

| | | |
|---|---|---|
| JP | H10-168206 | 6/1998 |
| JP | 11-509287 | 8/1999 |
| JP | 2002-292242 | 10/2002 |
| JP | 2005-255988 | 9/2005 |
| JP | 2006-342437 | 12/2006 |

OTHER PUBLICATIONS

San-Thap international Co.,Ltd. : "Expandable graphite" Thailand Apr. 15, 2008, XP002556153 Retrieved from the Internet: URL:http://www.san-thap.co.th/expandablegraphite.htm>.

Japanese Office Action mailed Sep. 25, 2012.

Extended European Search Report dated Dec. 23, 2009.

Anonymous:"Thermoplastic expadable microspheres used with resins to form lightweight core material-used in sandwich constructions, comprises thermoplastic polymaer shell and fluid core which expands on heating", XP002556372, Database WPI Week, 19932 Thomson Scientific, London, GB; May 10, 1993.

San-Thap International Co., Ltd.:"Expandable graphite"Thailand Apr. 15, 2008, XP0025556153 Retrieved from the inretnet : URL: http://www.san-thap.co.th/expandablegraphite.htm>.

* cited by examiner

FIG.7

| SAMPLE | FOAMING AGENT TEMPERATURE (wt%) | BLOWING AGENT TEMPERATURE (wt%) | CONTACT PRESSURE (kPa) | |
|---|---|---|---|---|
| | | | 150°C | 200°C |
| Smp1 | 6 | – | 239 | 204 |
| Smp2 | 6 | 6 (1 Kind) | 238 | 220 |
| Smp3 | 6 | 6 (2 Kinds) | 242 | 257 |
| Smp4 | 6 | 6 (3 Kinds) | 244 | 251 |
| Smp5 | – | – | 173 | 171 |
| Smp6 | – | 6 (1 Kind) | 167 | 156 |

MAT MEMBER AND EXHAUST GAS PROCESSING APPARATUS

CROSS-REFERENCE TO RELATED APPLICATIONS

This application is based upon and claims the benefit of priority of a Japanese Patent Application No. 2008-285840 filed on Nov. 6, 2008, the entire contents of which are incorporated herein by reference.

BACKGROUND OF THE INVENTION

1. Field of the Invention

The present invention generally relates to mat members and exhaust gas processing apparatuses, and more particularly to a mat member which includes inorganic fiber and an exhaust gas processing apparatus which includes such a mat member and is suited for use in vehicles and the like.

2. Description of the Related Art

The number of automobiles has increased considerably in this century, and the amount of exhaust gas emitted from internal combustion engines of the automobiles has shown a sharp increase. Particularly, various materials included within the exhaust gas of a diesel engine cause air pollution which greatly affect the environment on a world wide basis.

Under such circumstances, various exhaust gas processing apparatuses have been proposed and reduced to practice. A general exhaust gas processing apparatus has a tubular casing provided at an intermediate portion of an exhaust pipe that connects to an exhaust manifold of the engine, and an exhaust gas processing body accommodated within the tubular casing. The exhaust gas processing body has a inlet and an outlet for the exhaust gas, and a large number of micropores are provided within the exhaust gas processing body. Examples of the exhaust gas processing body include catalyst carriers, and exhaust gas filters such as Diesel Particulate Filters (DPFs). In the case of the DPF, for example, when the exhaust gas enters from the inlet of the exhaust gas processing body and exits from the outlet of the exhaust gas processing body within the casing, particles are trapped on walls surrounding the micropores to thereby remove the particles from the exhaust gas.

Normally, a holding seal member is provided between the exhaust gas processing body and the casing. The holding seal member prevents damage caused by the contact between the exhaust gas processing body and the casing when the vehicle or the like moves, and prevents the exhaust gas from leaking from a gap between the casing and the exhaust gas processing body. In addition, the holding seal member also prevents the exhaust gas processing body from falling off from the casing due to the exhaust gas pressure. On the other hand, the exhaust gas processing body is required to maintain a relatively high temperature in order to maintain its reaction, and the holding seal member is required to be heat resistant. In order to satisfy these requirements, the holding seal member may be made of a mat member which includes inorganic fiber such as alumina fiber.

The mat member is wound on at least a portion of an outer peripheral surface of the exhaust gas processing body, excluding the inlet and outlet, and is integrally fixed to the exhaust gas processing body by taping or the like in order to function as the holding seal member. Thereafter, the exhaust gas processing body, having the mat member integrally fixed thereon as the holding seal member, is press-fit within the casing to form the exhaust gas processing apparatus.

In the conventional exhaust gas processing apparatus, it is known from experience that the holding force of the holding seal member with respect to the exhaust gas processing body decreases in a relatively high temperature region of 400° C. to 500° C. In addition, when the holding force of the holding seal member with respect to the exhaust gas processing body greatly decreases, the exhaust gas processing body may fall off from the casing. In order to suppress the decrease in the holding force of the holding seal member with respect to the exhaust gas processing body in the high temperature region, the use of a mat member added with a material (or agent) that swells (or expands) as a result of heat exposure, such as vermiculite, which expands in the high temperature region, has been proposed in a Japanese Laid-Open Patent Publication No. 11-509287, for example.

SUMMARY OF THE INVENTION

According to one aspect of the present invention, a mat member comprises an inorganic fiber, an organic binder, and a material which expands at a temperature of approximately 130° C. to approximately 200° C. The "material which expands at a temperature of approximately 130° C. to approximately 200° C." may include a foaming binder which displays a maximum foaming behavior in this temperature region and/or a foaming binder which has a foaming start temperature at which the foaming starts within this temperature region.

In one embodiment, the mat member may comprise a plurality of different kinds of materials which expand at the temperature of approximately 130° C. to approximately 200° C.

In one embodiment, the material may include an organic material.

In one embodiment, the material may include a core formed by a hydrogen carbonate material and a shell formed by a thermoplastic organic material.

In one embodiment, the material may include at least one of azodicarbonamide (ADCA), dinitrosopentamethylenetetramine p,p'-oxybisbenzenesulfonylhydrazide (OBSH), and sodium hydrogen carbonate.

In one embodiment, the mat member may include the material in a range of approximately 1 wt. % to approximately 10 wt. % with respect to the entire mat member.

In one embodiment, the mat member may further comprise a material (or agent) that swells (or expands) as a result of heat exposure in a temperature region exceeding approximately 200° C., in addition to the material which expands at the temperature of approximately 130° C. to approximately 200° C. Examples of the material (or agent) that swells (or expands) as a result of the heat exposure are intumescents, blowing agents and expanding agents.

In one embodiment, the material (or agent) that swells (or expands) as a result of heat exposure may expand in a temperature region of approximately 400° C. to approximately 500° C.

In one embodiment, the inorganic fiber may include alumina and silica.

In one embodiment, the mat member may have a first surface and a second surface located on a side opposite from the first surface, and an amount of the material included at the first surface may be larger than that included at the second surface.

According to another aspect of the present invention, an exhaust gas processing apparatus comprises an exhaust gas processing body having an inlet and an outlet for an exhaust gas, a holding seal member provided around at least a portion of an outer peripheral surface of the exhaust gas processing body, excluding the inlet and the outlet, and a tubular casing configured to accommodate the exhaust gas processing body provided with the holding seal member, wherein the holding seal member is formed by the mat member having the structures described above.

In one embodiment, the exhaust gas processing body may form a catalyst carrier or an exhaust gas filter.

Other objects and further features of the present invention will be apparent from the following detailed description when read in conjunction with the accompanying drawings.

BRIEF DESCRIPTION OF THE DRAWINGS

FIG. 7 is a table illustrating the contact pressure of each sample at the different temperatures.

DESCRIPTION OF THE PREFERRED EMBODIMENTS

Figure 1:
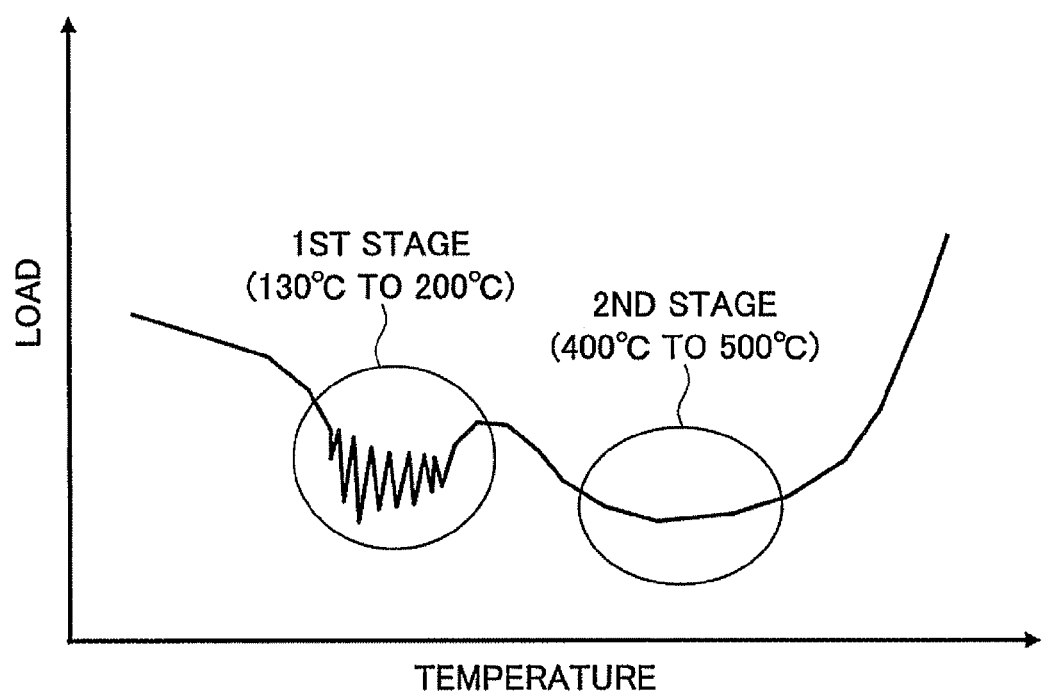
FIG. 1 is a diagram schematically illustrating a behavior of a holding force of a holding seal member with respect to temperature.

A description will be given of embodiments of a mat member and an exhaust gas processing apparatus according to the present invention, by referring to the drawings.

In the conventional exhaust gas processing apparatus, it is known from experience that the holding force of the holding seal member with respect to the exhaust gas processing body has a tendency to decrease in a relatively high temperature region of approximately 400° C. to approximately 500° C., for example. The exact cause of this tendency for the holding force of the holding seal member to decrease has not been confirmed. However, it may be regarded that an organic binder included in a mat member which forms the holding seal member decomposes or burns at the relatively high temperature, to thereby cause the holding force of the holding seal member to decrease. Generally, the mat member forming the holding seal member includes an organic binder on the order of approximately 1 wt. % to approximately 10 wt. %.

In order to suppress the decrease in the holding force of the holding seal member at the relatively high temperature of approximately 500° C., a mat member added with a material (or agent) that swells (or expands) as a result of heat exposure at the relatively high temperature has been proposed. When this proposed mat member is used for the holding seal member, the material (or agent) that swells (or expands) as a result of the heat exposure, included in the mat member, swells (or expands) at the relatively high temperature of approximately 500° C., to thereby improve the holding force of the holding seal member with respect to an exhaust gas processing body and suppress the holding force of the holding seal member from decreasing.

For example, the Japanese Laid-Open Patent Publication No. 11-509287 described above proposes adding vermiculite to the mat member which includes inorganic fiber, in order to suppress the decrease in the holding force of the holding seal member at the relatively high temperature of approximately 500° C.

On the other hand, according to experiments conducted by the present inventors, the present inventors have found that the holding force of the holding seal member with respect to the exhaust gas processing body shows a significant decrease even under a temperature which does not exceed approximately 400° C. The present inventors measured the actual change in the holding force of the holding seal member with respect to the temperature in order to experimentally confirm the behavior of the holding force of the holding seal member.

FIG. 1 is a diagram schematically illustrating the behavior of the holding force of the holding seal member with respect to the temperature. In FIG. 1, the ordinate indicates a load on the holding seal member, and the abscissa indicates the temperature at which the measurement was made. The load on the holding seal member, which will be described later in more detail, is an index that may be regarded as substantially indicating the holding force of the holding seal member. The measurements were made in the following manner.

First, a holding seal member having a length of approximately 267 mm, a width of approximately 83.5 mm and a thickness of approximately 7 mm, that is, an approximate size of 267 (mm)×83.5 (mm)×7 (mm), was prepared. Samples of mat members including inorganic fiber and organic binder which amounts to approximately 4.5 wt. % with respect to the total wt. % of the mat member, were used for the holding seal member. The holding seal member was wound around an exhaust gas processing body having a diameter of approximately 80 mm and fixed to the exhaust gas processing body. Then, this exhaust gas processing body was installed within a cylindrical metal casing having an internal diameter of approximately 88 mm. Heaters were embedded in sidewalls of this metal casing, and the metal casing and the inside of the metal casing can be heated by the heaters.

Next, the metal casing was set in a measuring apparatus in a state in which a center axis of the casing is vertical, that is, a state in which an inlet and an outlet of the exhaust gas processing body are aligned horizontally. A measuring apparatus INSTRON556 manufactured by INSTRON was used as the measuring apparatus. The metal casing set in the measuring apparatus was then heated.

In addition, a head of the measuring apparatus, having a diameter of approximately 40 mm, was lowered from above the metal casing in the vertical direction at a moving velocity of approximately 0.05 mm/minute with respect to the metal casing, in order to apply a shear force between the holding seal member and the exhaust gas processing body. The value of the load on the holding seal member was continuously measured as the head moved, and the temperature within the metal casing was raised at a rate of approximately 12° C./minute.

It is evident to those skilled in the art that the value of the load on the holding seal member measured in this manner for the evaluation corresponds to the holding force of the holding seal member.

From the results illustrated in FIG. 1, it was unexpectedly found that the holding force of the holding seal member shows a two-stage behavior with respect to the temperature. In other words, the present inventors have found that the holding force of the holding seal member with respect to the exhaust gas processing body has a tendency to decrease not only in the relatively high temperature region of approximately 400° C. to approximately 500° C., but also in a relatively low temperature region of approximately 130° C. to approximately 200° C. Such a two-stage behavior of the holding force of the holding seal member has not been reported in the past, and the present inventors newly found this unexpected behavior.

The exact reason for the two-stage behavior of the holding force of the holding seal member with respect to the temperature change has not been confirmed. However, with respect to the behavior in the low temperature region of approximately 130° C. to approximately 200° C., that is, in the first stage, it may be regarded, for example, that the organic binder included in the holding seal member softens due to heat and the strength (or hardness) of the holding seal member decreases, to thereby decrease the holding force of the holding seal member with respect to the exhaust gas processing body. On the other hand, with respect to the behavior in the high temperature region of approximately 400° C. to approximately 500° C., that is, in the second stage, it may be regarded, for example, that a portion of the organic binder included in the holding seal member melts and flows to an interface between the holding seal member and the exhaust gas processing body, to thereby deteriorate a frictional force at the interface.

Therefore, the results newly found by the present inventors and illustrated in FIG. 1 confirm the following:

(1) Merely suppressing the decrease in the holding force of the holding seal member with respect to the exhaust gas processing body in the high temperature region (or temperature range) of approximately 400° C. to approximately 500° C. is insufficient as a measure to prevent the decrease in the holding force of the holding seal member with respect to the exhaust gas processing body; and (2) Particularly in the case of the vehicle or the like using the diesel engine, the temperature of the exhaust gas is approximately 400° C. or lower, and thus, it would be more preferable from the point of view of improving the holding force of the holding seal member to suppress the decrease in the holding force of the holding seal member with respect to the exhaust gas processing body in the relatively low temperature region (or temperature range) of approximately 130° C. to approximately 200° C.

Based on the measurement results described above, the present inventors have optimized the mat member for use as the holding seal member, through research and development, in order to suppress the decrease in the holding force of the holding seal member with respect to the exhaust gas processing body in the relatively low temperature region of approximately 130° C. to approximately 200° C.

In one embodiment of the present invention, the mat member which includes inorganic fiber, also includes a material which expands at a temperature within the temperature region of approximately 130° C. to approximately 200° C.

Figure 2:
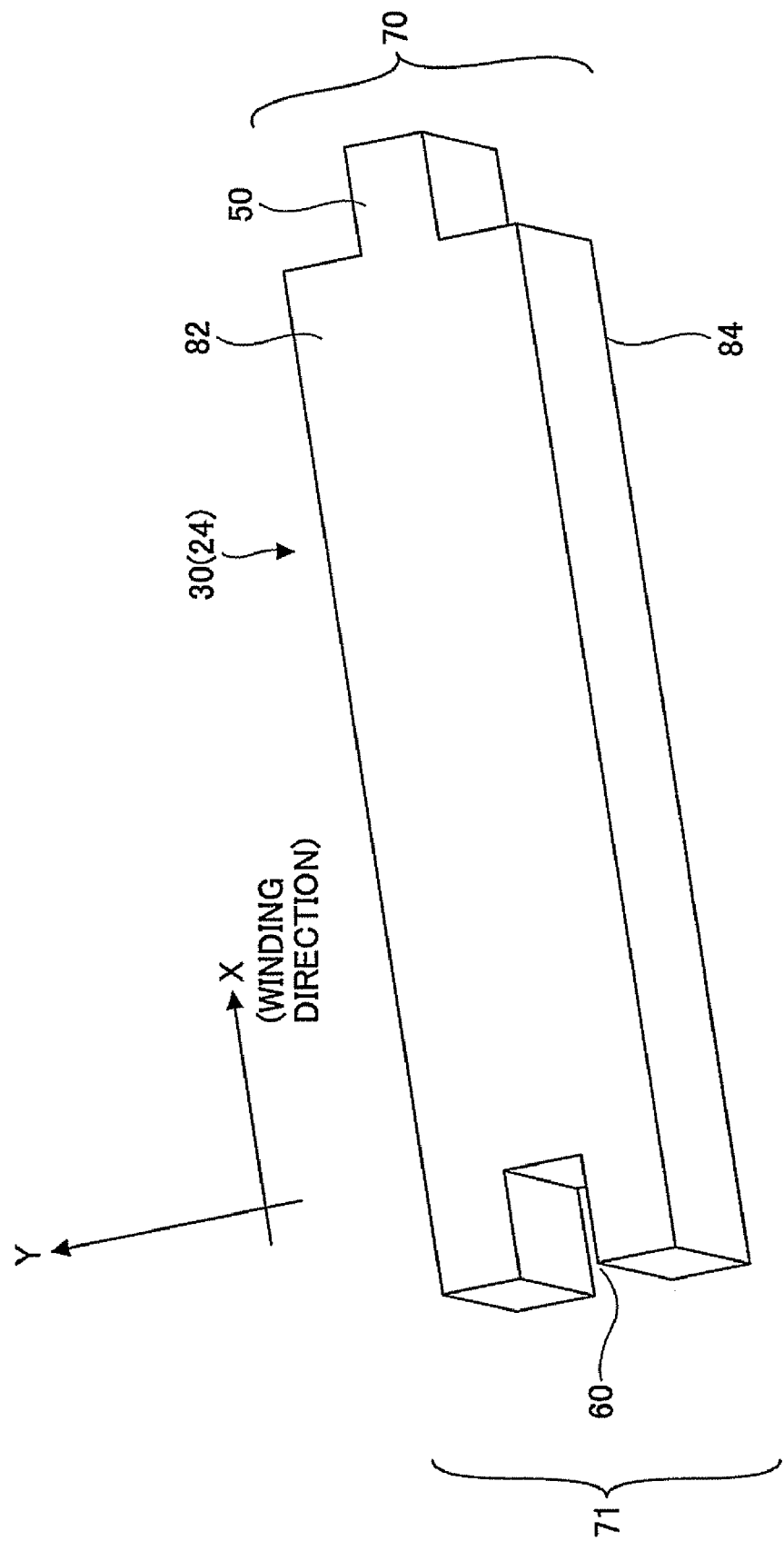
FIG. 2 is a perspective view schematically illustrating an example of a mat member in an embodiment of the present invention.

Next, a description will be given of the embodiment of the present invention in more detail, by referring to FIGS. 2 and 3. FIG. 2 is a perspective view schematically illustrating an example of the mat member in this embodiment of the present invention, and FIG. 3 is a diagram for explaining forming of the exhaust gas processing apparatus which uses the mat member as the holding seal member in this embodiment of the present invention.

As illustrated in FIG. 2, a mat member 30 according to this embodiment has a substantially rectangular shape with long sides parallel to a direction X and short sides parallel to a direction Y. A short side 70 has a projection 50 for fitting. A short side 71 has a recess 60 for fitting or, has two projections defining the recess 60. The shapes of the two short sides 70 and 71 are not limited to those illustrated in FIG. 2, and each of the two sides 70 and 71 may or may not have parts such as the projection and recess for fitting. In addition, the short side 70 may have a plurality of projections, and the short side 71 may have a plurality of recesses. The "substantially rectangular shape" of the mat member 30 includes the projection 50 and the recess 60 illustrated in FIG. 2, and also includes a shape wherein a corner part formed by mutually adjacent long and short sides forms an angle other than 90°, such as a rounded shape with a curvature, for example.

Figure 3:
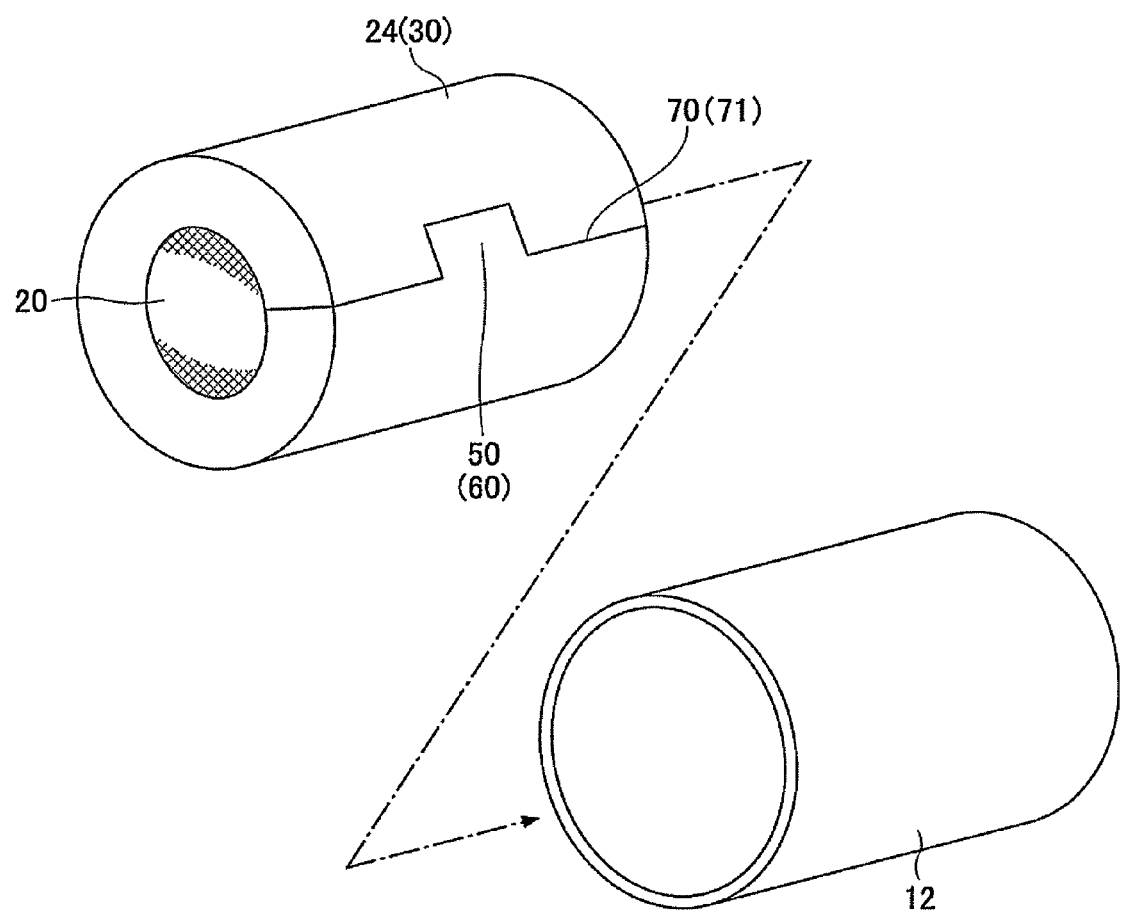
FIG. 3 is a diagram for explaining forming of an exhaust gas processing apparatus which uses the mat member as a holding seal member in an embodiment of the present invention.

When using the mat member 30 as a holding seal member 24, the longitudinal direction along the long side, that is, the direction X, corresponds to the winding direction in which the holding seal member 24 (or mat member 30) is wound on an exhaust gas processing body 20 which is illustrated in FIG. 3 and is used as a catalyst carrier or the like. In addition, when the holding seal member 24 is wound on the exhaust gas processing body 20, the projection 50 fits into the recess 60 as illustrated in FIG. 3 and the holding seal member 24 is fixed to the exhaust gas processing body 20. Thereafter, the exhaust gas processing body 20 having the holding seal member 24 wound thereon is press-fit and accommodated within a tubular casing 12 that is made of a metal or the like.

Normally, a mat member includes inorganic fiber such as alumina fiber and/or silica fiber, and an organic binder. But in this embodiment, the mat member 30 further includes a material which expands at a temperature within the temperature region of approximately 130° C. to approximately 200° C. Accordingly, when the mat member 30 of this embodiment is used as the holding seal member 24 that is wound around the exhaust gas processing body 20, the material included in the mat member 30 expands in the temperature region of approximately 130° C. to approximately 200° C., to thereby significantly suppress the decrease in the holding force of the holding seal member 24 with respect to the exhaust gas processing body 20 in the temperature region of approximately 130° C. to approximately 200° C.

Typical examples of the material which expands at a temperature within the temperature region of approximately 130° C. to approximately 200° C. include foaming agents. Accordingly, this embodiment will be described for a case where the foaming agent is used as the material which expands at a temperature within the temperature region of approximately 130° C. to approximately 200° C.

The kind of foaming agent included in the mat member 30, including the material, the foaming mechanism and the foaming starting temperature of the foaming agent at which the foaming starts, is not limited to a particular kind as long as the foaming agent expands at a temperature within the temperature region of approximately 130° C. to approximately 200° C. For example, the foaming agent may be a chemical reaction type foaming agent or, a thermal decomposition product type foaming agent. The chemical reaction type foaming agent utilizes the chemical reaction of one or more kinds of materials to generate the foaming phenomenon, and includes 2-liquid urethane foam. On the other hand, the thermal decomposition product type foaming agent includes a thermal decomposition material for generating a gas product by thermal decomposition, and utilizes the thermal decomposition or the gas product to generate the foaming phenomenon. For example, the thermal decomposition product type foaming agent includes a material in which a thermal decomposition material is dispersed in a matrix formed by an organic material. The thermal decomposition material may be an organic material or an inorganic material. The organic material used for the thermal decomposition material may include at least one of azodicarbonamide (ADCA) having a decomposition temperature of approximately 200° C., dinitrosopentamethylenetetramine (DPT) having a decomposition temperature of approximately 205° C., and p,p'-oxybisbenzenesulfonylhydrazide (OBSH) having a decomposition temperature of approximately 155° C. to approximately 160° C. In addition, the inorganic material used for the thermal decomposition material may include sodium hydrogen carbonate having a decomposition temperature of approximately 140° C. to approximately 170° C.

Each of the thermal decomposition materials may be used independently or, in combination with an assistant that is mixed to the thermal decomposition material. By mixing the assistant to the thermal decomposition material, it becomes possible to control the decomposition starting temperature at which the thermal decomposition starts within a relatively wide range of approximately 130° C. to approximately 200° C.

Of course, the chemical reaction type foaming agent and the thermal decomposition product type foaming agent are categories of the foaming agent that are used for the sake of convenience, and some foaming agents belong to both categories.

In addition, the form of the foaming agent used in this embodiment is not limited to a particular form. For example, the form of the foaming agent may be selected from a particle form, a paste form, and a sheet form. For example, the particle form foaming agent may be formed by a core made up of a hydrogen carbonate material having a relatively low boiling point, and a shell made up of a thermoplastic material or thermoplastic organic material. A foam particle material ADVANCELL EM manufactured by Sekisui Chemical Co., Ltd., for example, may be used for such a particle form foaming agent. The paste form foaming agent or the sheet form foaming agent may include a thermal decomposition material, such as that described above, dispersed within a matrix formed by an organic material having the paste form or the sheet form.

The amount of foaming agent included in the mat member 30 is not limited to a particular amount. For example, the amount of foaming agent may be set in a range of approximately 1 wt. % to approximately 10 wt. % with respect to the wt. % of the mat member 30 as a whole. If the amount of foaming agent exceeds approximately 10 wt. % and such a foaming agent is used for the holding seal member within the exhaust gas processing apparatus, the amount of organic components emitted from the exhaust gas processing apparatus significantly increases. On the other hand, if the amount of foaming agent is less than approximately 1 wt. %, the effects of according to one aspect of the present invention may not be obtained to a sufficient or satisfactory extent.

It is not essential for the mat member 30 of this embodiment to include an organic binder. This embodiment may be similarly applied to mat members which do not include an organic binder.

Furthermore, the mat member 30 according to one aspect of the present invention may include a material (or agent) that swells (or expands) as a result of heat exposure, such as intumescents, blowing agents and expanding agents, which material (or agent) expands in a temperature region exceeding approximately 200° C. Such a material (or agent) that swells (or expands) as a result of the heat exposure may expand in a relatively high temperature region of approximately 400° C. to approximately 500° C. When such a material (or agent) that swells (or expands) as a result of the heat exposure is used, it is possible to suppress the decrease in the holding force of the holding seal member 24 with respect to the exhaust gas processing body 20 not only in the relatively low temperature region but also in the relatively high temperature region. Such a material (or agent) that swells (or expands) as a result of the heat exposure includes a foaming agent such as the chemical reaction type foaming agent and the thermal decomposition product type foaming agent described above, blowing (or expansive) graphite, and the like. The blowing (or expansive) graphite includes a chemical material which generates gas when heated, and this chemical material is injected between blowing (or expansive) graphite layers. Normally, the blowing (or expansive) graphite has a blowing (or expansion) starting temperature at which the blowing (or expansion) starts within a range of approximately 200° C. to approximately 500° C.

Figure 4:
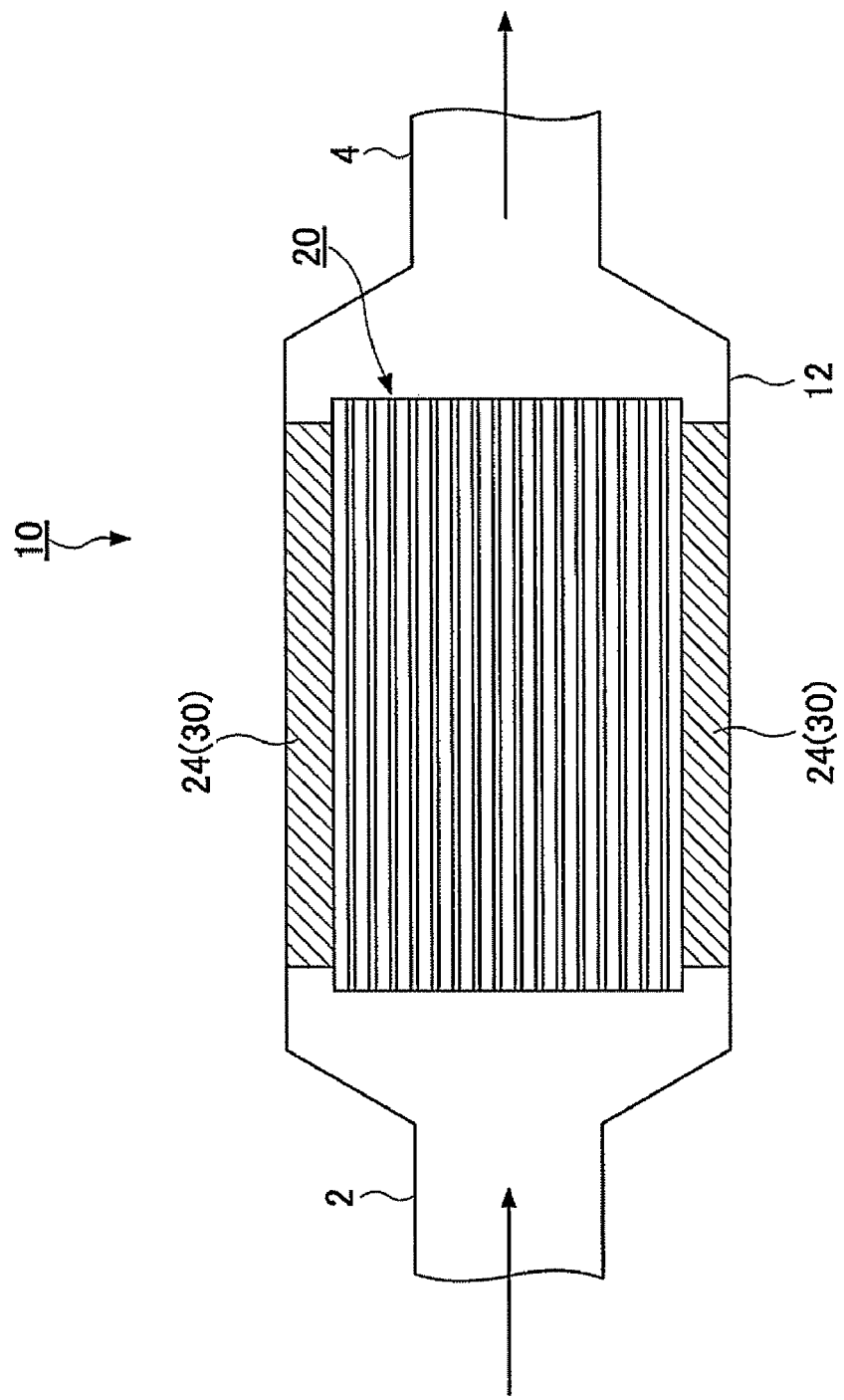
FIG. 4 is a diagram schematically illustrating the exhaust gas processing apparatus in the embodiment of the present invention.

The mat member 30 of this embodiment may be used as the holding seal member 24 in an exhaust gas processing apparatus 10, as illustrated in FIG. 4. FIG. 4 is a diagram schematically illustrating the exhaust gas processing apparatus 10 in the embodiment of the present invention.

The exhaust gas processing apparatus 10 illustrated in FIG. 4 includes the exhaust gas processing body 20, the holding seal member 24 that is wound around an outer peripheral surface of the exhaust gas processing body 20, a casing 12 accommodating the exhaust gas processing body 20 with the holding seal member 24, an inlet pipe 2 connected to the inlet side of the casing 12 and communicating with the inlet of the exhaust gas processing body 20, and an outlet pipe 4 connected to the outlet side of the casing 12 and communicating with the outlet of the exhaust gas processing body 20. In other words, the holding seal member 24 is provided around the outer peripheral surface of the exhaust gas processing body 20. The inlet pipe 2 has a tapered shape with a diameter which increases towards the position where the inlet pipe 2 connects to the inlet side of the casing 12. The outlet pipe 4 has a tapered shape with a diameter which increases towards the position where the outlet pipe 4 connects to the outlet side of the casing 12. In this example, the exhaust gas processing body 20 is formed by a catalyst carrier having a large number of penetration holes extending in a direction parallel to the exhaust gas flow, and the inlet and the outlet for the exhaust gas. The catalyst carrier may have a honeycomb structure made of porous silicon carbide or the like. Of course, the exhaust gas processing apparatus 10 in accordance with one aspect of the present invention is not limited to the structure illustrated in FIG. 4. For example, this embodiment is similarly applicable to an exhaust gas processing apparatus in which a portion of the penetration holes in a DPF forming the exhaust gas processing body 20 is blocked.

As described above, the holding seal member 24 in this embodiment is formed by the mat member 30. Hence, in the exhaust gas processing apparatus 10, the foaming agent included in the mat member 30 expands in the relatively low temperature region of approximately 130° C. to approximately 200° C. For this reason, it is possible to significantly suppress the decrease in the holding force of the holding seal member 24 with respect to the exhaust gas processing body 20 in the relatively low temperature region of approximately 130° C. to approximately 200° C. when compared to the exhaust gas processing apparatus using the conventional holding seal member. As a result, it is possible to prevent the exhaust gas processing body 20 from moving from a predetermined position and falling off from the casing 12, to thereby improve the reliability of the exhaust gas processing apparatus 10.

The properties of the mat member 30 described above is given for the case where the foaming agent is uniformly distributed within the mat member 30. However, the distribution of the foaming agent within the mat member 30 is not limited to the uniform distribution, and the foaming agent within the mat member 30 may have a non-uniform distribution.

For example, in FIG. 2, a first surface 82 of the mat member 30 and a second surface 84 on the opposite side from the first surface 82 having have mutually different foaming agent contents. In such a case, the mat member 30 is wound around the exhaust gas processing body 20 so that the second surface 84, for example, having the smaller foaming agent content, makes contact with the outer peripheral surface of the exhaust gas processing body 20.

Normally, in the exhaust gas processing apparatus 10, the central portion of the exhaust gas processing body 20 along the axial direction in which the exhaust gas flows has a high temperature, and the temperature decreases towards the outer peripheral surface of the exhaust gas processing body 20. Hence, when the mat member 30 is wound around the exhaust gas processing body 20 so that the second surface 84 having the smaller foaming agent content makes contact with the outer peripheral surface of the exhaust gas processing body 20, the first surface 82 having the larger foaming agent content is provided on the outer side of the exhaust gas processing apparatus 10 where the temperature is lower. Consequently, the expansion (or loss of foam) of the foaming agent as a whole is less likely to progress quickly, and the effect of suppressing the decrease in the contact pressure of the mat member 30 by the foaming agent can be maintained for a relatively long time.

Next, a description will be given of an example of a method of fabricating the mat member 30 of this embodiment.

The mat member of this embodiment is fabricated by the so-called paper-making method (or paper-forming method). Generally, this paper-making method supplies an inorganic fiber slurry into a paper mold having micro-holes in a bottom part thereof, and this paper mold is subjected to suction dehydration in order to form the mat member. A more detailed description of this method of fabricating the mat member of this embodiment using the paper-making method will be given hereafter.

First, predetermined amounts of inorganic fiber raw material, organic binder, and foaming agent of the kind described above are supplied into water and mixed. It is possible to additionally supply an inorganic binder and/or a flocculant into this mixture.

Raw cotton bulk of mixed fiber of alumina and silica, for example, may be used for the inorganic fiber raw material. In the following description, it is assumed for the sake of convenience that the mixture of alumina and silica is used as the inorganic fiber, but the inorganic fiber material is of course not limited to this mixture, and for example, it is possible to use only alumina or silica as the inorganic fiber. However, from the point of view of heat resistance, it is preferable to use the mixed fiber of alumina and silica as the inorganic fiber, and more preferably, the composition ratio of alumina and silica (that is, alumna:silica) is in a range of approximately 70:30 to approximately 74:26. If the alumina composition ratio is 60% or less, the composition ratio of mullite generated from alumina and silica becomes low and the thermal conductivity of the mat member becomes high, to thereby make it impossible to obtain a sufficiently high heat resistance.

Alumina sol, silica sol and like, for example, may be used for the inorganic binder. Latex and the like, for example, may be used for the organic binder. The organic binder content is preferably set so that the foaming agent and the organic binder combined amount to 20 wt. % or less. If the foaming agent and the organic binder combined amount to more than 20 wt. %, the amount of organic components emitted from the exhaust gas processing apparatus significantly increases.

Next, the mixture that is obtained is agitated within a mixer such as an agitator, and the fiber slurry is adjusted. Normally, the mixture is agitated for approximately 20 seconds to approximately 120 seconds.

Thereafter, the slurry is supplied to a mold having micro-holes in a bottom part thereof. Further, the mold is subjected to suction dehydration in order to form the raw material mat by sucking the moisture from the lower part of the mold by a suction apparatus or the like.

In addition, the raw material mat is compressed using a press or the like, heated to a predetermined temperature, and dried, in order to form the mat member. The compression process may be performed so that the sheet density after the compression is approximately 0.10 g/cm$^3$ to approximately 0.40 g/cm$^3$. The heating and drying process may be performed by setting the raw material mat within a heat treatment equipment, such as an oven, and heating the raw material mat at a temperature of approximately 90° C. to approximately 120° C. for 5 approximately minutes to approximately 60 minutes.

The mat member that is fabricated in this manner is thereafter cut in order to facilitate the handling of the mat member, and is finally further cut into a predetermined shape.

The mat member according to one aspect of the present invention may be obtained by the processes described above. In addition, it will be apparent to those skilled in the art that the mat member according to one aspect of the present invention may be fabricated by methods other than the paper-making method described above, including the so-called needling method.

The method of fabricating the mat member is described above for the case where the foaming agent is substantially distributed uniformly within the mat member. However, it will be apparent to those skilled in the art that a non-uniform mat member having the foaming agent distributed non-uniformly within the mat member may be fabricated in the same manner as the mat member having the foaming agent substantially distributed uniformly within the mat member.

For example, two mat members having different foaming agent contents may be bonded by a suitable adhesive agent or, sewn together, in order to fabricate a non-uniform mat member having foaming agent contents that are different between the side of the first surface 82 and side of the second surface 84, that is, having the foaming agent distributed non-uniformly within the non-uniform mat member.

Alternatively, if the foaming agent is provided in a liquid or paste form, the amount of foaming agent in the liquid or paste form that is coated on the mat member may be different between the first surface 82 and the second surface 84, in order to fabricate the non-uniform mat member. The mat member that is coated with the foaming agent in the liquid or paste form may be a mat member which is fabricated by the conventional method and includes no foaming agent or, a mat member which is fabricated by the method described above and has the foaming agent substantially distributed uniformly within the mat member.

Furthermore, the mat member may be fabricated in the following manner if the foaming agent in the particle form is used as it is. First, in a process in accordance with the paper-making method described above, predetermined amounts of an inorganic fiber raw material, an organic binder, and a flocculant are added to water and mixed, and it is possible to additionally include a predetermined amount of an inorganic binder in the mixture. The binder flocculates on the fiber by the action of the flocculant, and a foaming agent is added to the mixture after it is confirmed that the flocculant no longer has a sufficient flocculant effect, that is, after one minute elapses from the time when the mixture is formed, for example. Then, the mat member is fabricated according to the method described above.

According to this method, the flocculant effect of the flocculant is insufficient when the dehydration process described above is performed. For this reason the foaming material in the particle form which does not flocculate on the fiber moves downwards to accumulate at the bottom part of the mold. Finally, the mat member having different foaming agent contents between the top surface and the bottom surface of the mat member, that is, the non-uniform mat member, is fabricated according to a relatively simple fabrication method. Of course, the non-uniform mat member can be fabricated according to other methods.

Next, a description will be given of embodiment samples and effects obtained thereby.

First Embodiment Sample Smp1

First, 594 g of raw cotton bulk of alumina fiber, 36 g of organic binder such as latex, 4.8 g of inorganic binder such as alumina sol, and 36 g of foaming agent such as EMH204 manufactured by Sekisui Chemical Co., Ltd., each of which is on the market, were mixed with water so that the fiber concentration within the raw material liquid is 0.5 wt. %.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a first embodiment sample Smp1 having a size of 25 mm×25 mm.

The inorganic fiber density of the mat member (Smp1) was 0.19 g/cm$^3$, and the organic binder content of the mat member was 6 wt. %. In addition, the amount of the foaming agent with respect to the mat member was 6 wt. %.

Second Embodiment Sample Smp2

First, 594 g of raw cotton bulk of alumina fiber, 36 g of organic binder such as latex, 4.8 g of inorganic binder such as alumina sol, 36 g of foaming agent such as EMH204 manufactured by Sekisui Chemical Co., Ltd., and 36 g of high-temperature blowing agent such as blowing graphite SYZR802 supplied by Sanyo Trading Co., Ltd., each of which is on the market, were mixed with water so that the fiber concentration within the raw material liquid is 0.5 wt. %.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a second embodiment sample Smp2 having a size of 25 mm×25 mm.

The inorganic fiber density of the mat member (Smp2) was 0.19 g/cm$^3$, and the organic binder content of the mat member was 6 wt. %. In addition, the amount of the foaming agent with respect to the mat member was 6 wt. %, and the amount of the high-temperature blowing agent with respect to the mat member was 6 wt. %.

Third Embodiment Sample Smp3

First, 594 g of raw cotton bulk of alumina fiber, 36 g of organic binder such as latex, 4.8 g of inorganic binder such as alumina sol, 36 g of foaming agent such as EMH204 manufactured by Sekisui Chemical Co., Ltd., and 36 g of high-temperature blowing agent, each of which is on the market, were mixed with water so that the fiber concentration within the raw material liquid is 0.5 wt. %. Two kinds of high-temperature blowing agents, namely, blowing graphite SYZR801 and blowing graphite SYZR802 both supplied by Sanyo Trading Co., Ltd., of the same amount of 18 g, were used.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a third embodiment sample Smp3 having a size of 25 mm×25 mm.

The inorganic fiber density of the mat member (Smp3) was 0.19 g/cm$^3$, and the organic binder content of the mat member was 6 wt. %. In addition, the amount of the foaming agent with respect to the mat member was 6 wt. %, and the total amount of the high-temperature blowing agents with respect to the mat member was 6 wt. %.

Fourth Embodiment Sample Smp4

First, 594 g of raw cotton bulk of alumina fiber, 36 g of organic binder such as latex, 4.8 g of inorganic binder such as alumina sol, 36 g of foaming agent such as EMH204 manufactured by Sekisui Chemical Co., Ltd., and 36 g of high-temperature blowing agent, each of which is on the market, were mixed with water so that the fiber concentration within the raw material liquid is 0.5 wt. %. Three kinds of high-temperature blowing agents, namely, blowing graphite SYZR801, blowing graphite SYZR802 and blowing graphite SYZR803 each supplied by Sanyo Trading Co., Ltd., of the same amount of 12 g, were used.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a fourth embodiment sample Smp4 having a size of 25 mm×25 mm.

The inorganic fiber density of the mat member (Smp4) was 0.19 g/cm$^3$, and the organic binder content of the mat member was 6 wt. %. In addition, the amount of the foaming agent with respect to the mat member was 6 wt. %, and the total amount of the high-temperature blowing agents with respect to the mat member was 6 wt. %.

Fifth Embodiment Sample Smp5

First, 594 g of raw cotton bulk of alumina fiber, 36 g of organic binder such as latex, and 4.8 g of inorganic binder such as alumina sol, each of which is on the market, were mixed with water so that the fiber concentration within the raw material liquid is 0.5 wt. %.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a fifth embodiment sample Smp5 having a size of 25 mm×25 mm.

The inorganic fiber density of the mat member (Smp2) was 0.19 g/cm$^3$, and the organic binder content of the mat member was 6 wt. %.

Sixth Embodiment Sample Smp6

First, 594 g of raw cotton bulk of alumina fiber, 36 g of organic binder such as latex, 4.8 g of inorganic binder such as alumina sol, and 36 g of high-temperature blowing agent such as blowing graphite SYZR803 supplied by Sanyo Trading Co., Ltd., each of which is on the market, were mixed with water so that the fiber concentration within the raw material liquid is 0.5 wt. %.

Then, the raw material liquid was agitated for 60 seconds in an agitator.

Next, the raw material liquid was supplied to a mold having a size of 930 mm×515 mm×400 mm, and the moisture was removed via meshes provided at the bottom of the mold in order to obtain a wet sheet of alumina fiber. After compressing the wet sheet by a preliminary compression, the wet sheet was subjected to a press-dry process at 120° C. for 30 minutes, to thereby obtain a mat member having a thickness of 6.5 mm. Furthermore, the mat member was cut into a sixth embodiment sample Smp6 having a size of 25 mm×25 mm.

The inorganic fiber density of the mat member (Smp2) was 0.19 g/cm$^3$, and the organic binder content of the mat member was 6 wt. %. In addition, the amount of the high-temperature blowing agent with respect to the mat member was 6 wt. %.

Figure 5:
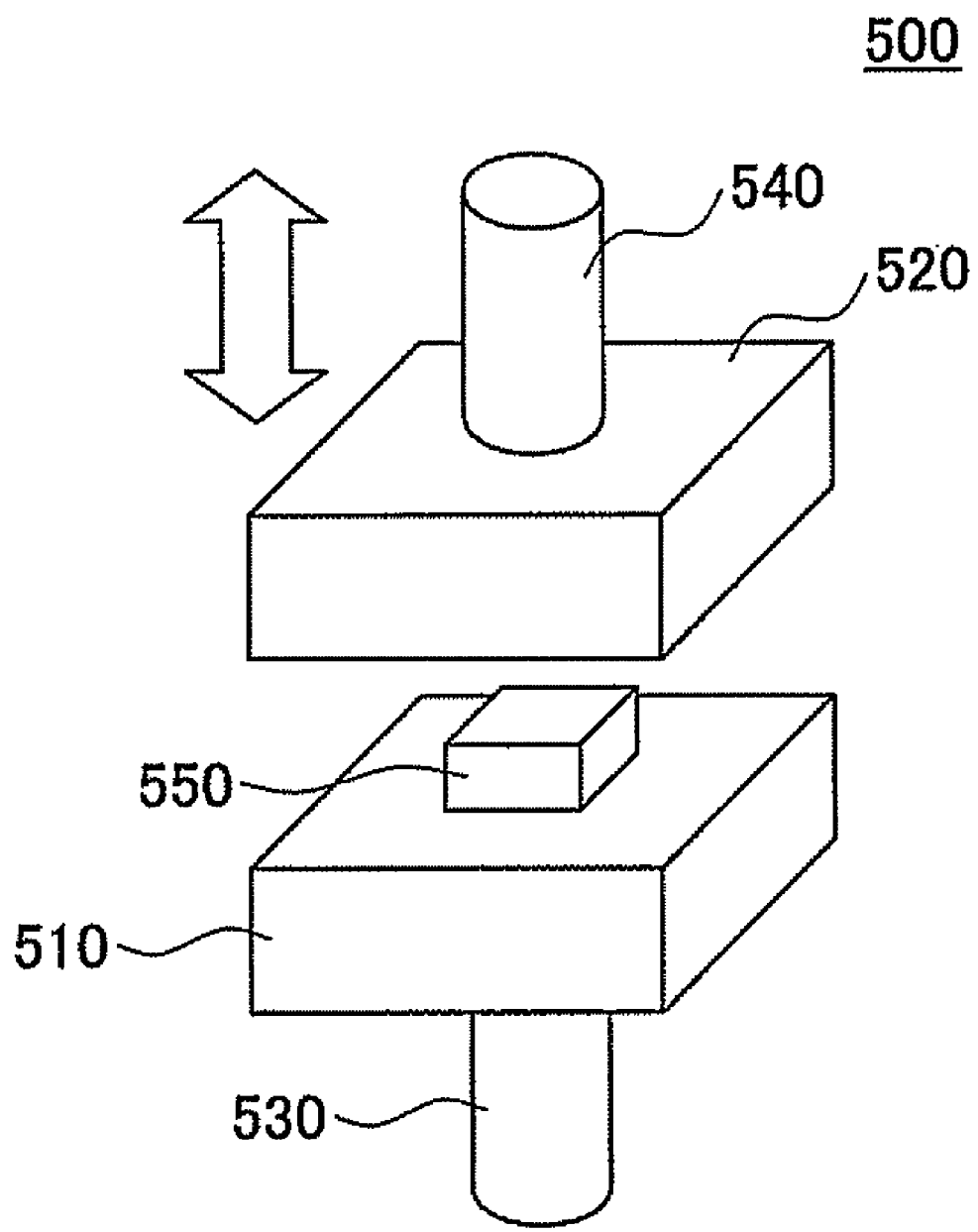
FIG. 5 is a diagram generally illustrating a contact pressure measuring apparatus.

In order to obtain the holding force of each of the embodiment samples Smp1 through Smp6, the contact pressure was measured at various temperatures. The contact pressure was measured in the following manner. FIG. 5 is a diagram generally illustrating a contact pressure measuring apparatus which was used for the measurements.

In FIG. 5, a contact pressure measuring apparatus 500 includes a lower base 510 and an upper base 520 which is arranged above the lower base 510. The upper and lower bases 520 and 510 have the same shape and dimensions, and are aligned in the vertical direction. Each of the upper and lower bases 520 and 510 has a built-in heater (not shown), and the upper and lower bases 520 and 510 can be heated to a predetermined temperature.

A lower surface of the lower base 510 is connected to a support 530 which is fixed and is immovable. For this reason, the lower base 510 is fixed. On the other hand, an upper surface of the upper base 520 is connected to a support 540 which is movable in the vertical direction. Hence, the upper base 520 is movable in the vertical direction, that is, movable up and down. In addition, the upper base 520 functions as a load cell, and in a state in which the upper base 520 pushes against the lower base 510, it is possible to measure the load applied on a lower surface of the upper base 520.

First, in the contact pressure measuring apparatus 500 having the structure described above, a sample 550 having a size of 25 mm×25 mm and corresponding to each of the embodiment samples Smp1 through Smp6 was set on an upper surface of the lower base 510. Then, the support 540 was lowered to lower the upper base 520. The lower base 520 was lowered until an apparent density GBD of the sample 550 becomes 35 g/cm$^3$. The apparent density GBD is an index obtained from [(the mass of the sample 550)/{the area (25 mm×25 mm) of the sample 550)/(thickness of the sample 550)].

Next, the heaters within the upper and lower bases 520 and 510 were heated so that the sample 550 reaches a predetermined measuring temperature. In this example, the predetermined measuring temperatures were set to 150° C. and 200° C.

Thereafter, the load for each sample 550 measured at the predetermined measuring temperatures were regarded as the contact pressure (kPa) of the sample 550.

According to the contact pressures measured (or tested) in this manner, it is possible to predict the holding force of the holding seal member at each of the predetermined measuring temperatures for the case where the mat member is used as the holding seal member.

Figure 6:
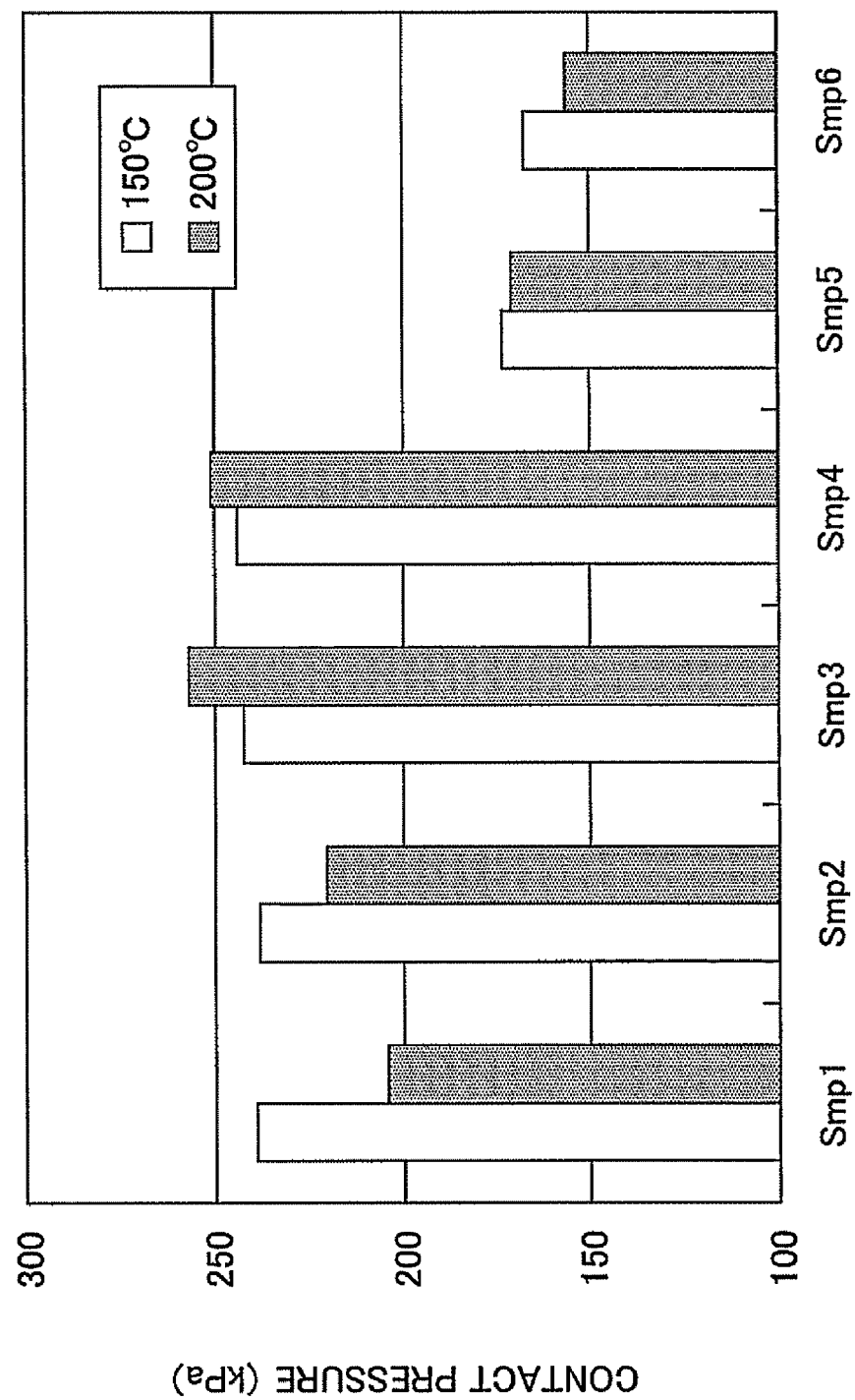
FIG. 6 is a graph illustrating a contact pressure of each sample at different temperatures.

The results of the measurements (or tests) are illustrated in FIGS. 6 and 7. FIG. 6 is a graph illustrating the contact pressure of each sample 550 at the different measuring temperatures, and FIG. 7 is a table illustrating the contact pressure of each sample 550 at the different measuring temperatures.

It was confirmed from the results of the measurements that the contact pressure for the embodiment samples Smp1 through Smp4 is higher than that for the embodiment samples Smp5 and Smp6.

Hence, the mat member in accordance with one aspect of the present invention is suited for use as a holding seal member of an exhaust gas processing apparatus that is used in vehicles or the like for each temperature.

Further, the present invention is not limited to these embodiments, but various variations and modifications may be made without departing from the scope of the present invention.

What is claimed is:

1. An exhaust gas processing apparatus comprising:
an exhaust gas processing body having an inlet and an outlet for an exhaust gas;
a holding seal member provided around at least a portion of an outer peripheral surface of the exhaust gas processing body, excluding the inlet and the outlet; and
a tubular casing configured to accommodate the exhaust gas processing body provided with the holding seal member,
wherein the holding seal member is formed by a mat member comprising an inorganic fiber, an organic binder, a first material which expands at a temperature of approximately 130° C. to approximately 200° C. and includes a core formed by a hydrogen carbonate material and a shell formed by a thermoplastic organic material, and a second material that swells as a result of heat exposure in a temperature region exceeding approximately 200° C., the second material being mixed with the first material.

2. The exhaust gas processing apparatus as claimed in claim 1, wherein the exhaust gas processing body forms a catalyst carrier or an exhaust gas filter.

3. An exhaust gas processing apparatus comprising:
an exhaust gas processing body having an inlet and an outlet for an exhaust gas;

a holding seal member provided around at least a portion of an outer peripheral surface of the exhaust gas processing body excluding the inlet and the outlet; and a tubular casing configured to accommodate the exhaust gas processing body provided with the holding seal member, wherein the holding seal member is formed by a mat member comprising an inorganic fiber, an organic binder, a material which expands at a temperature of approximately 130° C. to approximately 200° C. and includes a core formed by a hydrogen carbonate material and a shell formed by a thermoplastic organic material, and a second material that swells as a result of heat exposure in a temperature region exceeding approximately 200° C., the second material being mixed with the first material, the mat member has a first surface and a second surface located on a side opposite from the first surface, an amount of the first material included at the first surface is larger than that included at the second surface, and the second surface of the mat member contacts the exhaust gas processing body in at least the portion of the outer peripheral surface of the exhaust gas processing body excluding the inlet and the outlet.

4. The exhaust gas processing apparatus as claimed in claim 3, wherein the exhaust gas processing body forms a catalyst carrier or an exhaust gas filter.

* * * * *